June 18, 1929.  E. WIRZ  1,717,485
UNLOADING JACK
Filed March 19, 1926
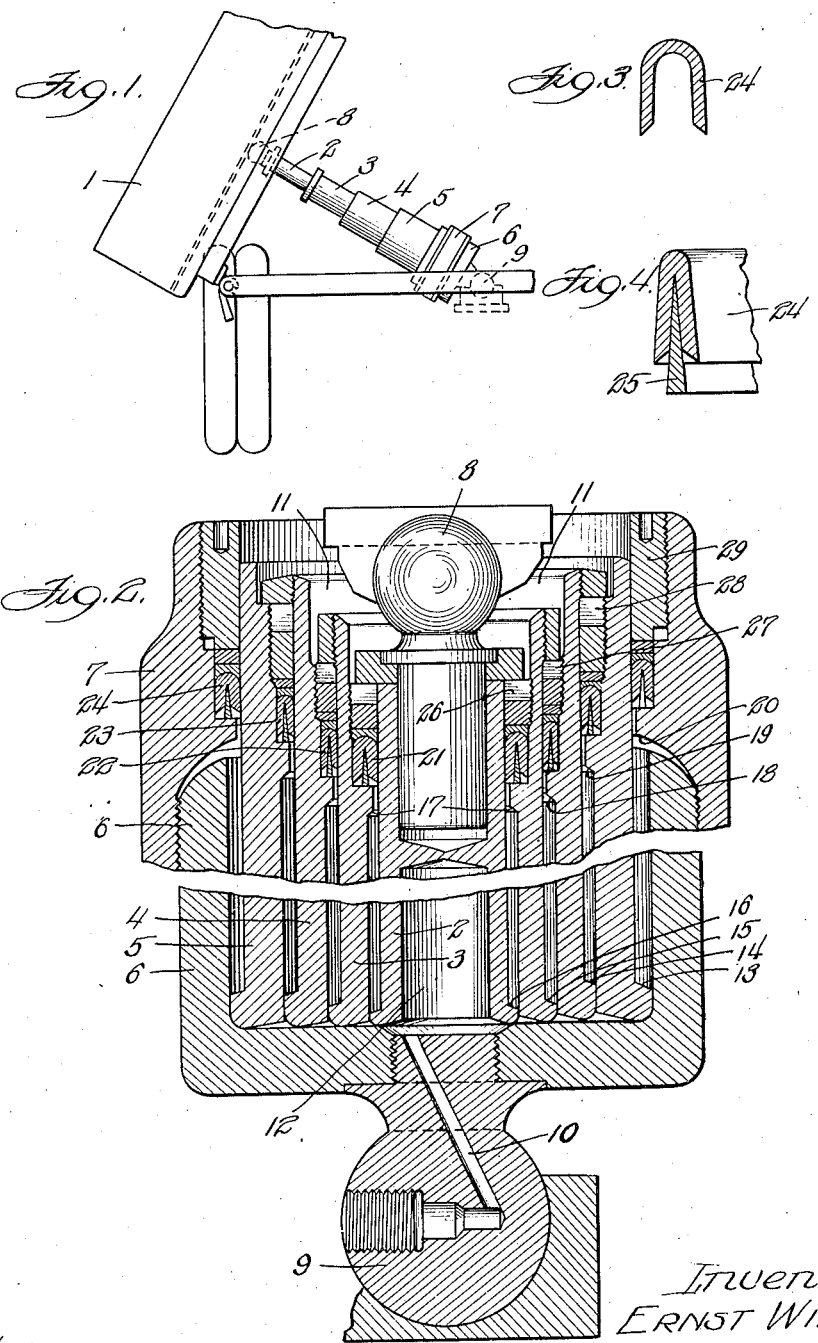
Inventor:
ERNST WIRZ
Witness:
a. a. Brand
By Jones, Addington, Ames & Seibold
Attys.

Patented June 18, 1929.

1,717,485

UNITED STATES PATENT OFFICE.

ERNST WIRZ, OF UETIKON, SWITZERLAND.

UNLOADING JACK.

Application filed March 19, 1926, Serial No. 95,904, and in Germany March 31, 1925.

My invention relates to apparatus for hydraulically tilting vehicle bodies to unload the same, and it has particular relation to the provision of means which are operated by a telescopic arrangement of the pistons.

More especially my invention contemplates the provision of an expansible telescoping press or piston member to tilt vehicle bodies around any desired pivot to unload the same, said piston member being composed of a plurality of hollow nested pistons so arranged that a maximum tilting length is obtained with a minimum volume of occupancy when said piston is in normal or non-operating position.

Motor vehicles are being built in ever increasing lengths which markedly complicates the problem of providing tilting means for the bodies thereof, since a greater stroke is necessary in order to tip the body at a sufficiently steep angle. Moreover, vehicles of the more recent types are pinion driven, wherefrom a driving member extends longitudinally of the vehicle to the rear axis thereof, thus occupying to a large extent the area which has heretofore been available to receive the thrust of a tilting member. This is particularly true because, in the later types of vehicles, the driving shift is along the central longitudinal axis and very materially limits the space which may be utilized in connection with the tilting device.

In vehicles which are adapted to tip in any one of three directions, the lifting device must act upon the center of the body, which further complicates the situation. In fact, in vehicles as at present constructed, the circular space which may be utilized to mount an hydraulic press is not over 25 centimeters in diameter.

My invention, therefore, has for its object to reconcile the above conflicting requirements in such a way that desirable operating charactertistics are obtained. I employ a plurality of nested telescoping members comprising at least four, and sometimes more, hollow telescoped pistons. The engageable areas or faces of adjacent pistons, that is, the upper face of the lower end of one piston and the lower face of the upper end of the next larger or adjacent piston, are beveled so that a maximum contact area is obtained with a minimum wall thickness of the piston.

Moreover, as will hereinafter be more fully pointed out, the upper end faces of the pistons are staggered as regards height in such manner that the greater portion of the upper bearing, which presses against the vehicle body to raise and tip the same, is normally contained within the sleeve which is at the upper ends of the largest and outermost cylinder.

My invention will be better understood when considered in connection with the accompanying drawing, in which:

Figure 1 is a fragmentary diagrammatic view of the rear end of a vehicle showing the same tipped to one side by means of a piston arrangement embodying my invention;

Fig. 2 is a sectional, elevational view of the piston arrangement embodying my invention;

Fig. 3 is an illustration of one of the packing members used in connection with my invention; and Fig. 4 is an elevational, fragmentary, sectional view of the packing member employed in my invention.

Referring now more particularly to the drawings, the vehicle body is shown at 1, the same being tilted by a piston arrangement comprising nested pistons 2, 3, 4 and 5, said pistons collapsing into an outer casing comprising a main portion 6 and a cap portion 7 screwed thereinto. The upper bearing 8 is fitted to the top of the innermost piston 2 and comprises the thrust member which serves to lift and tilt the vehicle body, while a ball pivot 9 is disposed in a socket and is provided with a channel 10 through which the pressure fluid is supplied to the interior of the press or hydraulic casing 6. In this connection, it will be noted that the bearing member 8 at the top of the innermost piston is normally contained within the space 11, that is, within the upper end of the sleeve surrounding the nested pistons.

At the lower end of the innermost piston 2 is a hollow space 12 which serves as an air vessel and produces a smooth working of the piston member, the air in the same being entrapped and functioning as an air cushion when the piston system is operated.

Another feature of marked advantage in my invention resides in the provision of beveled engageable faces of the annular engaging rings on the upper and lower ends of the nested pistons, that is to say, beveled faces 13, 14, 15 and 16. These abutting annular portions in the lower ends of the pistons contact with the faces beveled in a like direction, that is 17, 18, 19 and 20, as the pistons are thrust in an outward direction. By thus beveling these engaging faces, I am enabled to obtain a maximum area of engagement with a minimum thickness of piston wall.

By this novel arrangement of contacting faces, I eliminate to a marked degree one difficulty which has been productive of a great deal of trouble in connection with devices of this character, namely, that of extensive wear between the engaging faces. Heretofore these engaging surfaces have been shouldered at right angles and the high pressures used have caused these shoulders to gradually upset thereby jamming the pistons and ultimately shearing off the lower shoulders.

A further improvement, which is of marked advantage in connection with a piston system embodying my invention, is the manner in which the pistons are packed to prevent the extrusion of oil, and to permit ready adjustment at all times of said packing. The packing members between the adjacent pistons are shown at 21, 22, 23 and 24, the cross-section of one such annular ring being shown in Fig. 3, wherefrom it is seen that a cross-section of the ring is equitant in character, having two downwardly extending arms and an upper cross member. This equitant-section ring is usually made of leather, and a conically sectioned metal ring 25 is pressed in an upward direction into said leather member, the whole comprising a packing which is positioned between the pistons as shown, The above packing members are secured in the pistons proper by screw threads and adjusting rings 26, 27, 28 and 29 by tightening these rings. The combined action thereof with the metal ring 25 tends to separate the arms of the packing member into close contact with the adjacent pistons thereby eventuating a packing ring or member which is of peculiar benefit when used in connection with a hydraulically operated tipping mechanism of my invention.

While I have described but one embodiment of my invention, and have pointed out the advantages resident in providing four or more nested pistons, I wish it understood that my invention is to be limited only by the scope of the appended claim and the prior art.

I claim:

A compact fluid pressure operated actuating device for tilting vehicle bodies to unload the same which comprises a plurality of nested telescoping cylinders of increasing internal diameter slidably engaged with each other and packed against escape of actuating fluid by means of annular equitant resilient packing members, said cylinders being of progressively increasing length in the order of increasing diameter, an outer cylindrical vessel surrounding said movable cylinders and slidably engaged by the outer cylinder, a universal joint attached to one end of the smallest of said cylinders so positioned that when said cylinders are telescoped within each other said universal joint is entirely within the nested cylinders, a second universal joint attached to the cylindrical vessel aforesaid, and means within said second universal joint whereby actuating fluid is admitted into the nest of cylinders, the entire assembly presenting a compact unit adapted to fit between a differential casing and a body of a motor vehicle.

ERNST WIRZ.